United States Patent
Li et al.

(10) Patent No.: US 8,180,354 B2
(45) Date of Patent: May 15, 2012

(54) METHOD FOR ALLOCATING RADIO RESOURCE IN MULTI-CARRIER TIME DIVISION DUPLEX MOBILE COMMUNICATION SYSTEM

(75) Inventors: Feng Li, Beijing (CN); Shihe Li, Beijing (CN); Yusong He, Beijing (CN); Guiliang Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 877 days.

(21) Appl. No.: 11/662,724

(22) PCT Filed: Sep. 12, 2005

(86) PCT No.: PCT/CN2005/001466
§ 371 (c)(1),
(2), (4) Date: Jan. 30, 2008

(87) PCT Pub. No.: WO2006/029568
PCT Pub. Date: Mar. 23, 2006

(65) Prior Publication Data
US 2008/0287137 A1 Nov. 20, 2008

(30) Foreign Application Priority Data
Sep. 13, 2004 (CN) .......................... 2004 1 0074683

(51) Int. Cl.
*H04W 40/00* (2009.01)
(52) U.S. Cl. ........ 455/447; 455/446; 455/448; 455/449; 370/280; 370/320
(58) Field of Classification Search .................. 455/450, 455/448, 447, 445, 446, 449, 454; 370/320, 370/341
See application file for complete search history.

(56) References Cited

U.S. PATENT DOCUMENTS

| | | | |
|---|---|---|---|
| 2004/0171385 A1* | 9/2004 | Haustein et al. | 455/450 |
| 2005/0099989 A1* | 5/2005 | Rudolf et al. | 370/347 |

FOREIGN PATENT DOCUMENTS

| | | |
|---|---|---|
| CN | 1387707 | 12/2002 |
| CN | 1430429 | 7/2003 |
| JP | 2003264524 | 9/2003 |
| KR | 10-2004-0063061 | 7/2004 |

* cited by examiner

*Primary Examiner* — Kent Chang
*Assistant Examiner* — Magdi Elhag
(74) *Attorney, Agent, or Firm* — Merchant & Gould P.C.

(57) ABSTRACT

A method for distributing wireless resource in multicarrier time division duplexing mobile communication system, such as TD-CDMA system, to overcome the shortage of 3GPP single carrier cell channel distribution technology of covering more lager area in composing cellular system, which contains using an area of covering same or almost same as a cell, selecting one carrier as main carrier and other carriers as auxiliary carrier, the frequency of main carrier is as different as possible, setting all public control channel in main carrier, the left resource of main carrier and resource of auxiliary carrier are used in uplink and downlink service channel, the arrangement of public channel in main carrier is same with that in single carrier cell.

7 Claims, 6 Drawing Sheets

METHOD FOR ALLOCATING RADIO RESOURCE IN MULTI-CARRIER TIME DIVISION DUPLEX MOBILE COMMUNICATION SYSTEM

FIELD OF THE INVENTION

The present invention relates to mobile communication technologies, more particularly to a radio resource (channel) allocating method for a multi-carrier time division duplex (TDD) mobile communication system realizing multi-carrier working mode in a cell or a sector such as a multi-carrier cell in a time division synchronous code division multiple access (TD-SCDMA) system.

BACKGROUND OF THE INVENTION

Only single carrier working mode is specified in a current $3^{rd}$ generation TDD communication mode specification (refer to relating technology specifications in 3GPP). FIG. 1 shows a single carrier cell channel allocation in a TD-SCDMA system specified in 3GPP standard. As shown in FIG. 1, taking a TD-SCDMA system with 3 carriers (f0, f1, f2) as an example, an independent cell may be constituted by one carrier. In each carrier, a broadcasting channel (BCH) and a paging channel (PCH) are arranged in its TS0 timeslot, an uplink physical random access channel (PRACH) is arranged in its TS1 or other uplink timeslots, a common control channel such as a fast physical access channel (FPACH) is arranged in its TS6 or any other downlink timeslots, and remaining code channels of the arranged timeslots and all code channels of remaining timeslots are used as uplink and downlink traffic channels. From a network view, each carrier corresponds to a cell and respective carrier in each cell works independently.

In order to meet a communication requirement in a high density application environment, base station is designed to work with multi-carriers. In a multi-carrier TDD mobile communication system designed based on this idea, a wireless base station adopting a multi-carrier working mode may use multi-carriers in one cell. For example, three carrier frequencies (f0, f1 and f2) are used in one cell to increase the cell capacity, in other words, such arrangements also reduce system cost, simplify system design, make control and management of the system easier and improve system efficiency. Based on the standard of the above $3^{rd}$ generation mobile communication TDD communication mode, when the base station is designed to work with multi-carriers, each carrier may be processed only by regarding it as a single cell. Therefore, in a same geographical position, there might be multiple independent cells under the same or similar coverage conditions provided. For example, one mobile communication system operator in many European countries can obtain 5 Mhz TDD frequency band and if the TD-SCDMA system is adopted, it can support 3 carriers, i.e., three cells will be covered in the same geographical position.

Taking a case using TD-SCDMA system as an example, a system resource (channel) allocation status in each cell (each carrier) in the system can be obtained from FIG. 1. When a cellular mobile network is to be organized and it covers large areas, this system resource (channel) allocation technology has following disadvantages:

(1) Low system efficiency. Since each carrier must be configured with common channels, each carrier's channel resource for uplink and downlink traffic is reduced greatly. For example, TS0 of each carrier has been allocated to BCH and PCH; in a downlink timeslot, such as TS6, 8 code channels must be allocated to FPACH; in a uplink timeslot, such as TS1, 2 code channels must be allocated to PRACH. Thus when spreading factor is 16, only 86 (14+8+4×16) code channels can be allocated to uplink and downlink traffic by each carrier, in another word, only 21 bidirectional voice service or a unidirectional 384 kbps data service can be supported.

(2) Complicated management and control leading to efficiency decrease of some functions. The system considers that the same base station in the same geographical position covers three cells, which makes the number of cells increases, and increases the management and control complexity. For an important function of dynamic channel allocation (DCA) in the mobile communication system, since the execution of this function can only occupy the resources of the local cell while the resources of the local cell is very limited (spreading factor is 16 and available timeslots and code channels are limited, i.e., available overall resources which can be allocated are limited), the DCA technology can not put to effect because of the limited resources.

(3) It will be hard for the system to process a random access or a handover of a terminal, which causes detection difficulty. In the cellular mobile communication system, the terminal may move to a position near 3 to 6 base stations. FIG. 2 shows a typical cellular mobile network which illustrates base stations 101, 102 . . . 108 (represented by triangles respectively) and the position of terminal 500 (represented by a diamond), wherein the nearest base stations are 103, 105 and 107 and the near base stations are 101, 102, 103, 104, 106, 108 and the terminal 500 receives signals 201, 202 . . . 208 from the base stations 101, 102 . . . 108 respectively and interference signals 301 and 302 from distant co-frequency base stations. The terminal 500 may receive different downlink pilot codes from neighboring cells on a downlink pilot timeslot (DwPTS) of each carrier, wherein the number of the downlink pilot codes equals to a product of the number of the base stations and the number of carriers of each base station. For example, if an occupied bandwidth is 10 MHz and each base station may use 6 carriers, the terminal 500 may receive signals from around or more than 20 cells. At this time, since it is impossible for the downlink pilot signals from different cells to be synchronous, SNR can reach −5 to −8 dB on each carrier frequency, which makes it more difficult for the terminal to search for and to access the cell; while in a connected mode (communication mode), if each base station uses multi-carriers, the terminal may detect signals from around 10 different cells and levels of these signals are close, which causes detection difficulty. The above cases thus lead to many wrong handovers and handover difficulty, which causes the system unstable.

(4) In the cellular network, after being transmitted for a far distance, the downlink pilot signals (transmitted in DwPTS), such as 301 and 302 shown in FIG. 2, of distant co-carrier frequency base stations may interfere uplink pilot signals transmitted by the terminal 500, which increases the difficulty of accessing the system.

Generally, the wireless base stations in the cellular mobile communication system adopt multi-carrier working mode to increase the cell capacity, in other words, the system capacity is increased while the system cost is reduced. For the TD-SCDMA system (as one of the 3rd generation mobile communication system standards), the current standard only supports single carrier working mode and when adopting the multi-carrier working mode, each carrier may be processed only by regarding it as a single cell, which thus causes the above four disadvantages. Therefore, it is necessary to design radio resource (channel) allocating method for a multi-carrier TDD mobile communication system realizing multi-carrier working mode in a cell or a sector, so as to support the multi-carrier working mode for the multi-carrier TDD mobile communication system.

SUMMARY OF THE INVENTION

An object of the present invention is to provide a radio resource allocating method for a multi-carrier TDD mobile communication system so as to support the multi-carrier TDD mobile communication system to allocate the radio resource (channel) when working in a multi-carrier mode in a cell or a sector.

A technical solution realizing the object of the present invention is: a radio resource allocating method for a multi-carrier TDD mobile communication system includes regarding a same or approximately same area served by and covered by a multi-carrier base station as one cell; in the cell, selecting one carrier as a main carrier and taking other carriers as auxiliary carriers; and arranging all common control channels in the main carrier and using remaining resources of the main carrier and resources of the auxiliary carrier resource for uplink and downlink traffic channel.

When selecting the main carrier of the cell, frequencies of the main carrier used by neighboring base stations are made different.

The common control channels are arranged in TS0 timeslot of the main carrier; all code channels in the remaining timeslots of the main carrier and traffic code channels of the auxiliary carriers are used as uplink and downlink traffic channels.

Arranging common control channels in the main carrier includes transmitting downlink pilot signals on the main carrier and performing random access on the main carrier.

Arranging common control channels in the main carrier includes an arrangement of a BCH and PCH in a TS0 timeslot of the main carrier, an arrangement of a DwPCH in a DwPTS.

The main carrier and all auxiliary carriers use a same scrambling code and a same basic midamble code.

A multi-slot traffic is configured on the main carrier or on a same auxiliary carrier.

Uplink and downlink traffic of a same terminal are configured on the main carrier or on a same auxiliary carrier.

Uplink and downlink traffic of a same terminal are configured on the main carrier or on different auxiliary carriers.

According to the method of the present invention, a cell or a sector served by a base station with multi-carriers and covering a same or approximately a same area is regarded as one cell; in the cell, one carrier is selected as the main carrier and other carriers are auxiliary carriers and when selecting the main carrier, frequencies of the main carriers used by neighboring base stations in the system are made different. All the common control channels (DwPCH, BCH, PCH, FPACH, PRACH, etc.) are arranged in corresponding timeslots of the main carrier and downlink pilot signals are only transmitted in the DwPTS of the main carrier so that random access and handover are only performed on the main carrier. Remaining code channels in the arranged timeslots of the main carrier, remaining timeslots (unarranged timeslots) of the main carrier, traffic timeslots of the other carriers, code channels in the traffic timeslot (traffic code channel resources of the auxiliary carrier resources) are used as uplink and downlink traffic channels. The traffic code channel resources of the auxiliary carrier resources are not all the timeslots and all the code channels of all the auxiliary carriers, since configuring common control channels only on the main carrier is to eliminate interference and if traffic channels are also configured in the TS0 of the auxiliary carriers there might be interference; therefore the usage condition of the TS0 of the auxiliary carriers is limited; in addition, the UpPTSs of the auxiliary carriers cannot be used as traffic timeslots.

It should be noted that taking the design complexity of the terminal into account, uplink pilot signals currently are allowed to be transmitted only on the main carrier for UpPCHs. However, with the development of the terminal technology, it may be possible to transmit uplink pilot signals on the auxiliary carriers and thus interference may be mitigated.

Compared with the radio resource allocation method in the single carrier TD-SCDMA system according to the current standard, the method of the present invention can greatly improve the system efficiency and capacity by arranging common control channels only on the main carrier and traffic channels on the auxiliary carriers. The present invention can make the management and control simple by regarding a cell or a sector served by a base station with multi-carriers and covering a same or approximately a same area as one cell (the number of the cells is reduced), and the increase of resources in the local cell can contribute to the implementation of the DCA function. By transmitting downlink pilot signals only on the main carrier (i.e. the terminal only receives different downlink pilot codes from neighboring cells on the main carrier), which makes the number of the different downlink pilot codes possibly received from neighboring cells reduced, the present invention can contribute to the cell search of the terminal, contribute to the random access and handover and avoid many wrong handovers, so that the random access of the terminal is easier and no extra cost and complexity is required. The present invention can improve and perfect the multi-carrier TDD mobile communication system since neighboring base stations use different frequencies of the main carriers and reduce the inner system interference (downlink pilot timeslot signals from neighboring co-frequency base stations interfere uplink access timeslot signals of the local cell).

BRIEF DESCRIPTION OF THE DRAWINGS

FIG. 5 is a configuration diagram showing neighboring base stations in a multi-carrier multi-cell system use different frequencies as main carriers, wherein

DETAILED DESCRIPTION OF THE INVENTION

The present invention discloses a channel arrangement (resource allocation) method for a multi-carrier base station and is illustrated by taking a TD-SCDMA system as an example. In the invention, a cell or a sector served by a base station with multi-carriers and covering a same or approximately a same area is regarded as one cell.

Figure 3:
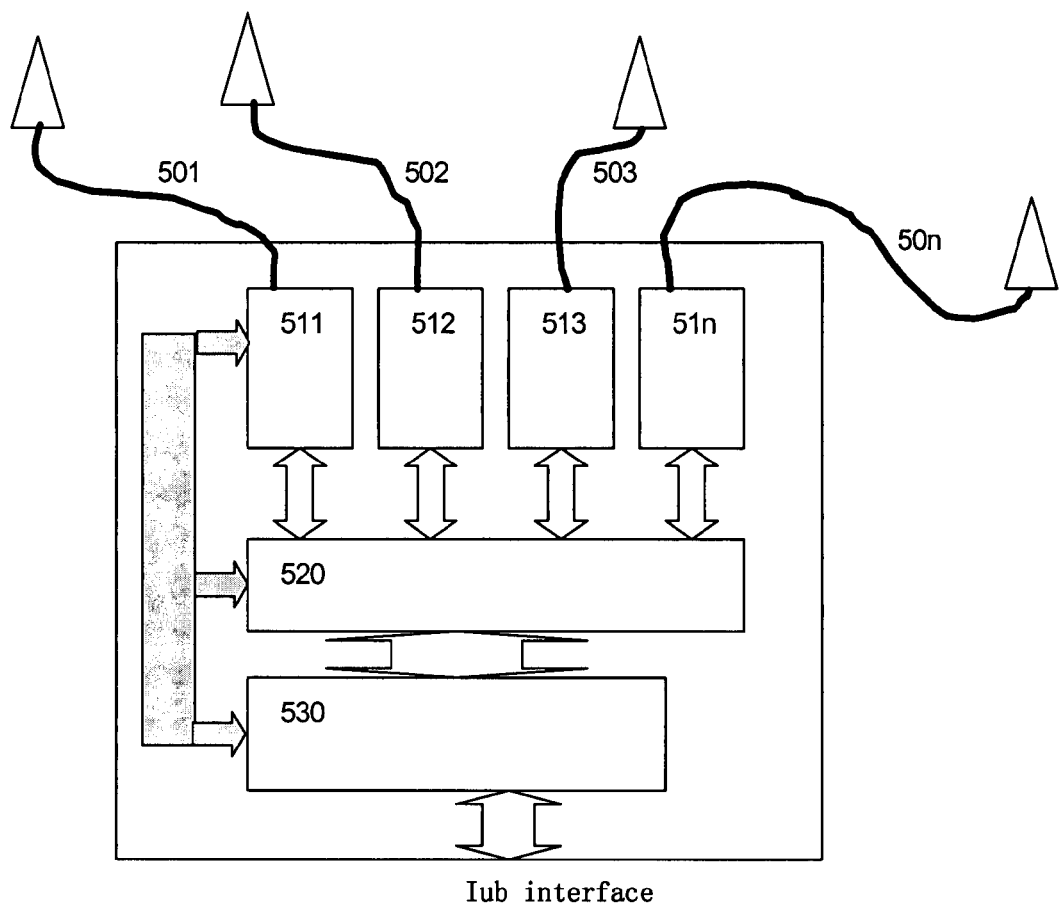
FIG. 3 is a block diagram showing an architecture of a base station in a multi-carrier multi-cell system.

FIG. 3 shows the architecture of a multi-carrier multi-cell base station. This multi-carrier base station can support one or more cell (or sector) and includes a common control and interface unit 530, a multi-carrier base band processing unit 520, multi-carrier IF processing units 511, 512, 513 ... 51n and multi-carrier RF units 501, 502, 503 ... 50n. The RF units 501, 502, 503 ... 50n include antennas (single antenna or an antenna array composed by multiple antennas), feed lines and RF transceivers. Base station design including working frequency bandwidth and output power level is determined according to the supported number of carriers and cell coverage requirements. The number of the RF units equals to that of the cells supported by the base station. Each of the RF units 501, 502, 503 ... 50n is connected to its digital IF processing units 511, 512, 513 ... 51n respectively. For example, the RF unit 501 is connected to the digital IF processing unit 511 which accomplishes filtering, distribution and combination of multi-carriers. Each digital IF processing unit is connected to a base band processor 520 with large capacity, processes base band digital signals for all carriers of each cell, and finishes various works on processing physical layer signals. The control and interface unit 530 of the base station controls all the units of the base station, completes the data processing between itself and the RNC and the functions of Iub interface, wherein the data processing includes packing and unpacking. The multi-carrier multi-cell base station has a large capacity and a flexible configuration, which cannot be achieved by the current single carrier base station.

Figure 1:
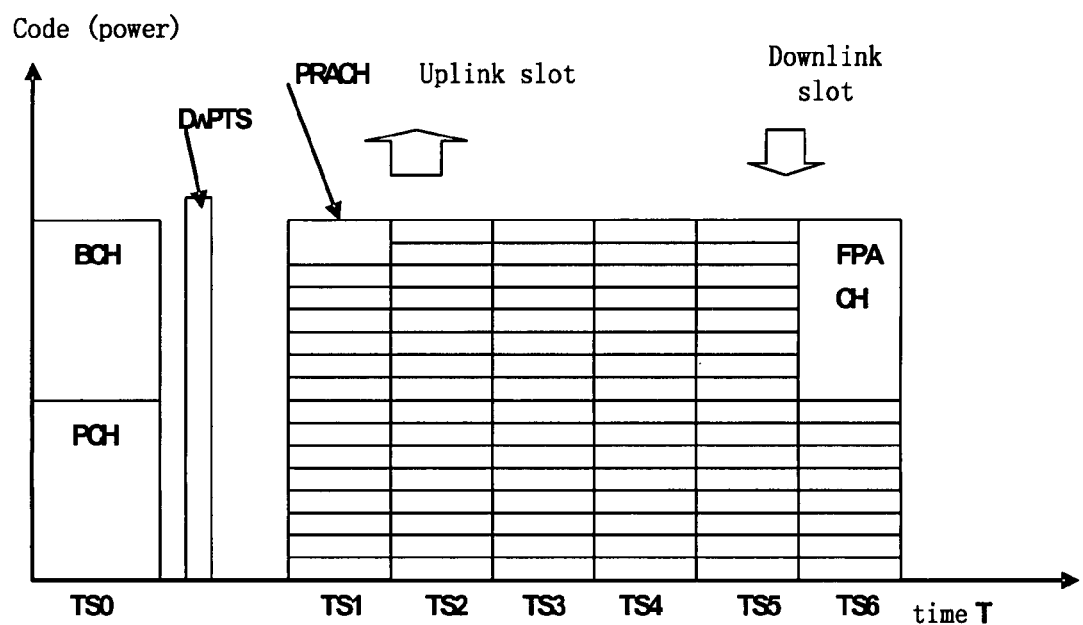
FIG. 1 is a diagram showing a radio resource allocation in a single carrier cell of a TD-SCDMA system according to 3GPP standard.
Figure 2:
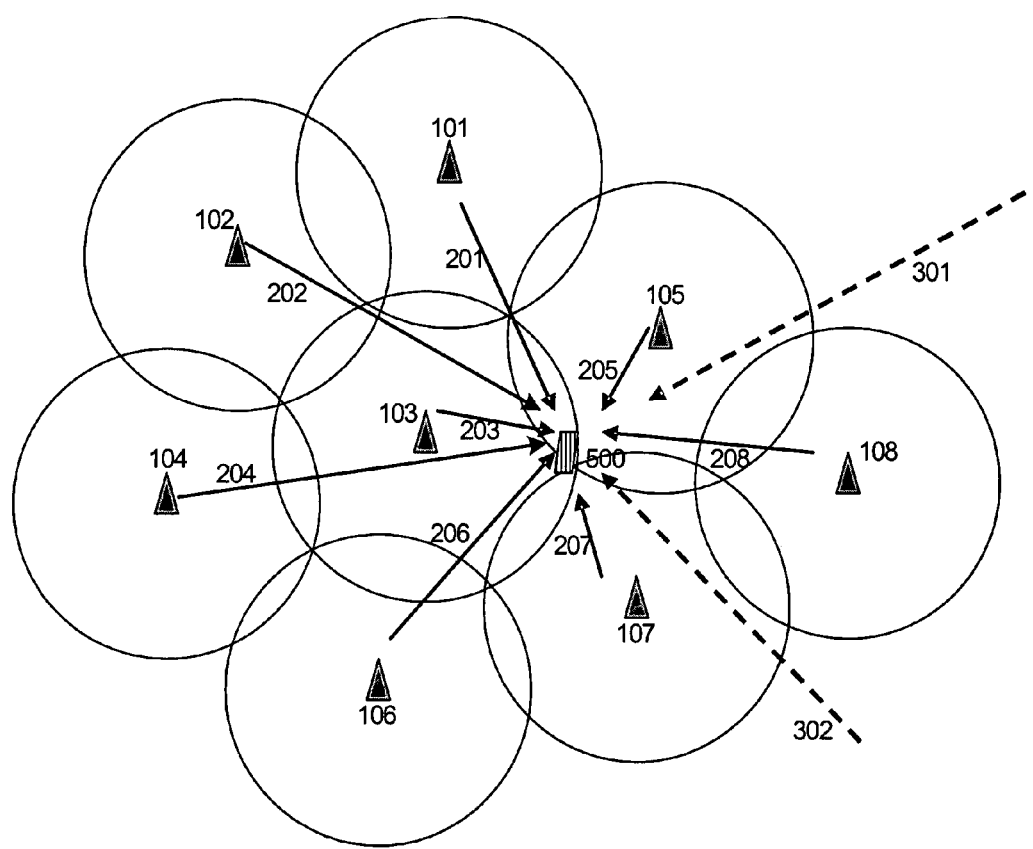
FIG. 2 is a schematic diagram showing a status of random access and handover of a terminal in a typical cellular mobile communication network.
Figure 4:
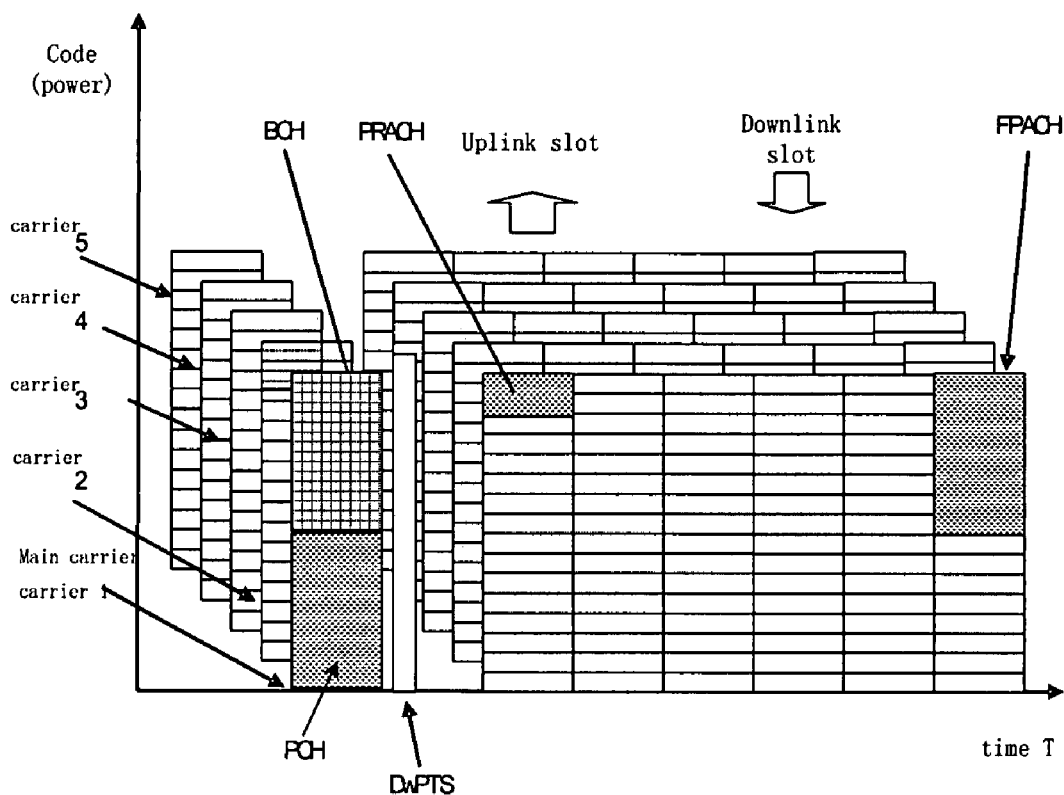
FIG. 4 is a schematic diagram showing a channel allocation in a multi-carrier cell in a multi-cell TDD system according to the present invention.

FIG. 4 shows when the spreading factor is 16 one carrier is selected as the main carrier from the shown carrier 1 to carrier 5. As shown in FIG. 4, carrier 1 is selected as the main carrier and the other carriers (carrier 2 to carrier 5) are auxiliary carriers. All the common control channels, such as the DwPCH (DwPTS), BCH, PCH, PRACH, FPACH are arranged on the main carrier. The arrangement solution is the same with the channel allocation solution in a single carrier cell shown in FIG. 1, for example, the BCH and PCH are arranged in the TS0 timeslot, the PRACH is arranged in the uplink timeslot TS1 by occupying two code channels, the FPACH is arranged in the downlink timeslot TS6 by occupying 8 code channels. The remaining resources of the main carrier (including timeslots and code channels) and all the traffic resource (timeslots and code channels) of the other carriers (carrier 2 to carrier 5) are used for traffic. The base station only transmits the synchronous signal (i.e. downlink pilot signal) for the DwPTS on the main carrier. The random access is performed on the main carrier. Thus, the base station only uses the DwPTS, UpPTS, PRACH and FPACH in the main carrier. Therefore, all the traffic timeslots of the other carriers (carriers 2-5) can be used for carrying traffic.

In the example of the radio resource (channel) allocation in the multi-carrier TD-SCDMA cell as shown in FIG. 4, in order to obtain better effect, the following method can be adopted: the main carrier and the auxiliary carriers use the same scrambling code and the same basic midamble code; common control channels such as the DwPCH, P-CCPCH, PICH, PRACH, UpPCH, FPACH are only configured on the main carrier; it's better to configure the multi-timeslot traffic on the same carrier frequency so as to reduce the complexity of the user terminal; it's better to configure the uplink and downlink traffic of the same terminal on the same carrier frequency but they also can be configured on different carrier frequencies; it's specified that the common control channels such as the DwPCH, P-CCPCH, PICH are configured on the main carrier, since the BCCH is a logical channel and physical channels mapped from the BCCH may be P-CCPCH and S-CCPCH. The P-CCPCH is required to be allocated in the TS0 of the main carrier and it is not specified the S-CCPCH be put in which downlink timeslot.

As shown in FIG. 5, when organizing the cellular mobile communication network and using the method of the present invention, it's better that the main carriers used by neighboring base stations are different (if the main carriers of part neighboring cells are the same, the present invention is still applicable). Since when 3G TDD frequencies are allocated in each country, each operator may at least obtain 5 MHz bandwidth. Within the bandwidth, 3 TD-SCDMA carriers can be arranged; therefore, it is possible for neighboring cells to use different main carriers. FIG. 5 shows the main carrier configuration in the case of 5 MHz bandwidth and 3 carriers.

Figure 5A:
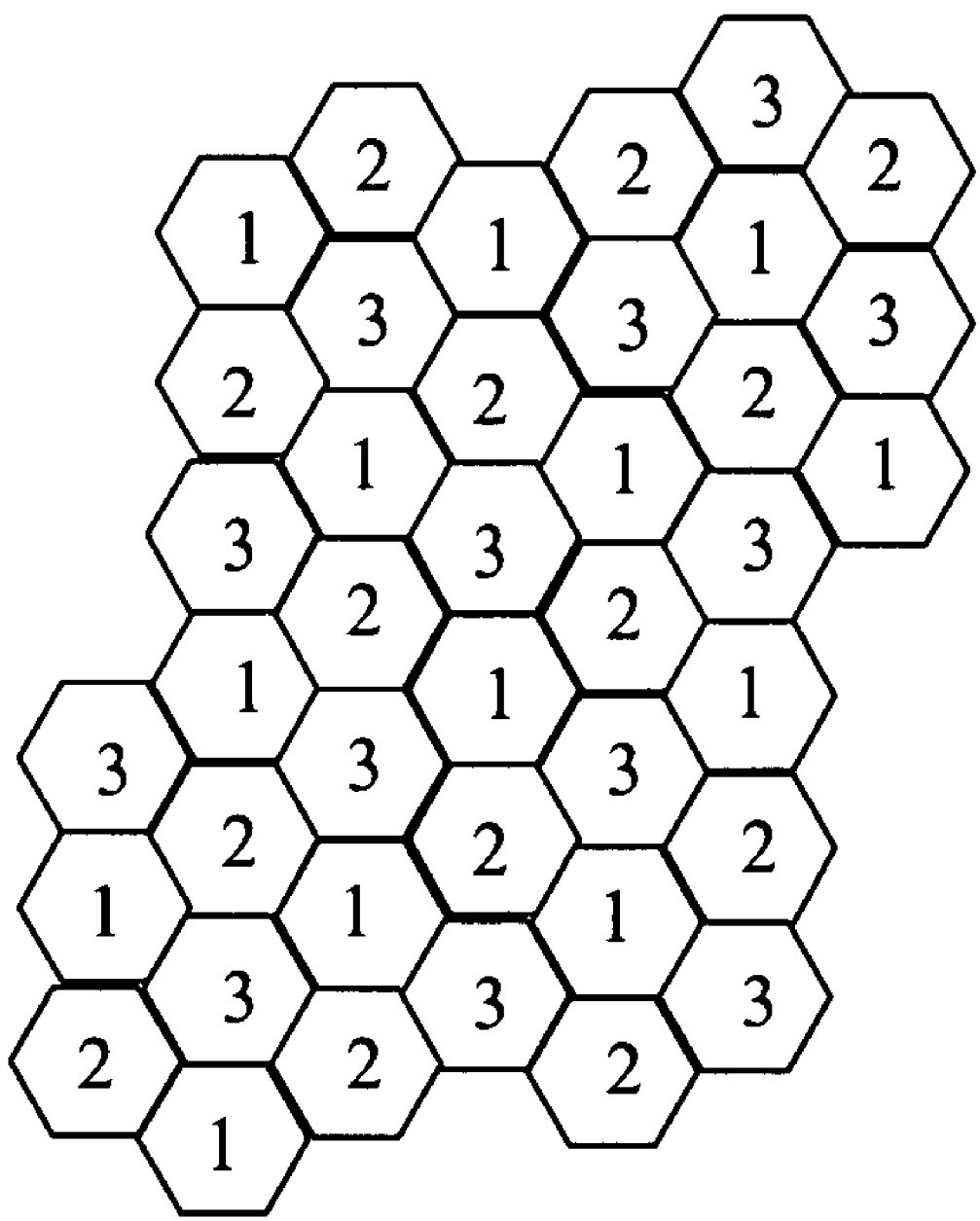
FIG. 5A shows a configuration diagram when omnidirectional antenna are adopted and FIG. 5B shows a configuration diagram when 120° antennas are adopted.

FIG. 5A shows each cell uses an omnidirectional antenna, the cell structure is in a shape of a hexagon and neighboring cells use different main carriers represented by 1, 2 and 3 respectively. As shown in FIG. 5A, any three neighboring cells use different main carriers represented by 1, 2 and 3 respectively.

Figure 5B:
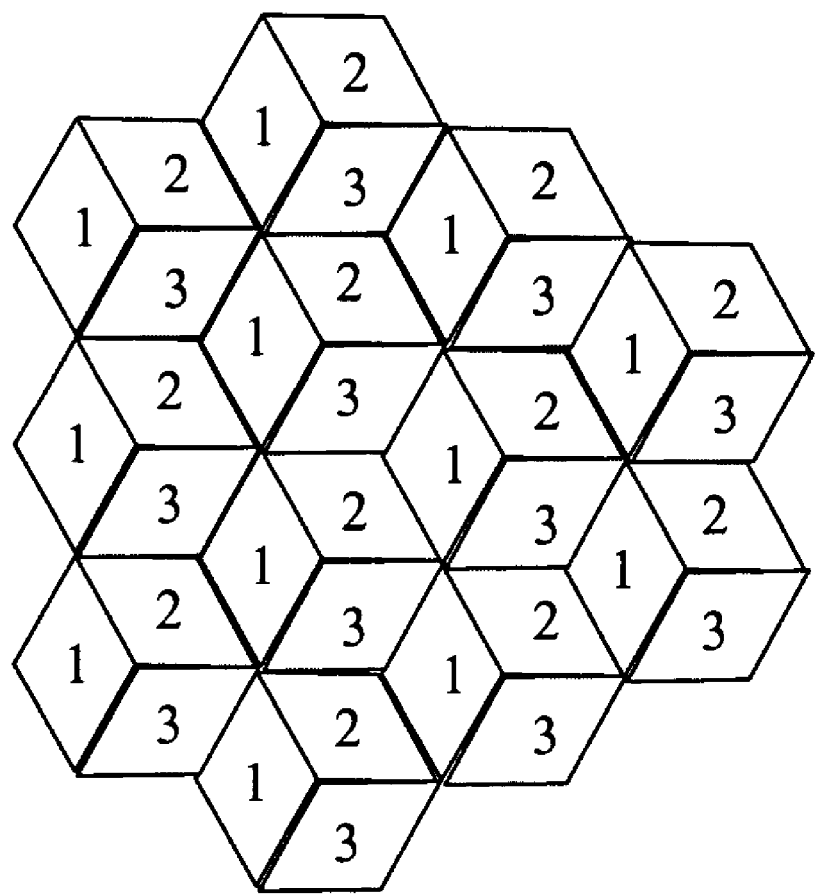

FIG. 5B shows each cell uses a 120° sector antenna, the cell structure is in a shape of a diamond and neighboring cells use different main carriers represented by 1, 2 and 3 respectively. As shown in FIG. 5B, any three neighboring cells use different main carriers represented by 1, 2 and 3 respectively.

Obviously, the main carrier frequencies of various cells are different and the multi-carrier multi-cell system of the present invention can be realized.

The invention claimed is:

1. A radio resource allocating method for a multi-carrier time division duplex mobile communication system, comprising:
   regarding a same or approximately same area served by and covered by a multi-carrier base station as one cell;
   in the cell, selecting one carrier as a main carrier and taking other carriers as auxiliary carriers; and
   arranging common control channels in the main carrier and using remaining resources of the main carrier and resources of the auxiliary carrier for uplink and downlink traffic channel;
   wherein arranging common control channels in the main carrier comprises transmitting downlink pilot signals on the main carrier and performing random access on the main carrier; and when selecting the main carrier of the cell, frequencies of the main carriers used by neighboring base stations are made different.

2. The method as defined in claim 1, wherein the common control channels are arranged in a TS0 timeslot of the main carrier; all code channels in the remaining timeslots of the main carrier and traffic code channels of the auxiliary carriers are used as uplink and downlink traffic channels.

3. The method as defined in claim 1, wherein arranging common control channels in the main carrier comprises arranging a broadcasting channel and paging channel in a TS0 timeslot of the main carrier, and arranging a downlink pilot channel in a downlink pilot timeslot.

4. The method as defined in claim 1, wherein the main carrier and all auxiliary carriers use a same scrambling code and a same basic midamble code.

5. The method as defined in claim 1, further comprising:
   configuring a multi-slot traffic on the main carrier or on the same auxiliary carrier.

6. The method as defined in claim 1, further comprising:
   configuring uplink and downlink traffic of a same terminal on the main carrier or on the same auxiliary carrier.

7. The method as defined in claim 1, further comprising:
   configuring uplink and downlink traffic of a same terminal on the main carrier or on different auxiliary carriers.

* * * * *